April 10, 1934.  F. PRANTL  1,954,770
TRACTION MOTOR CONTROL SYSTEM
Filed March 10, 1932
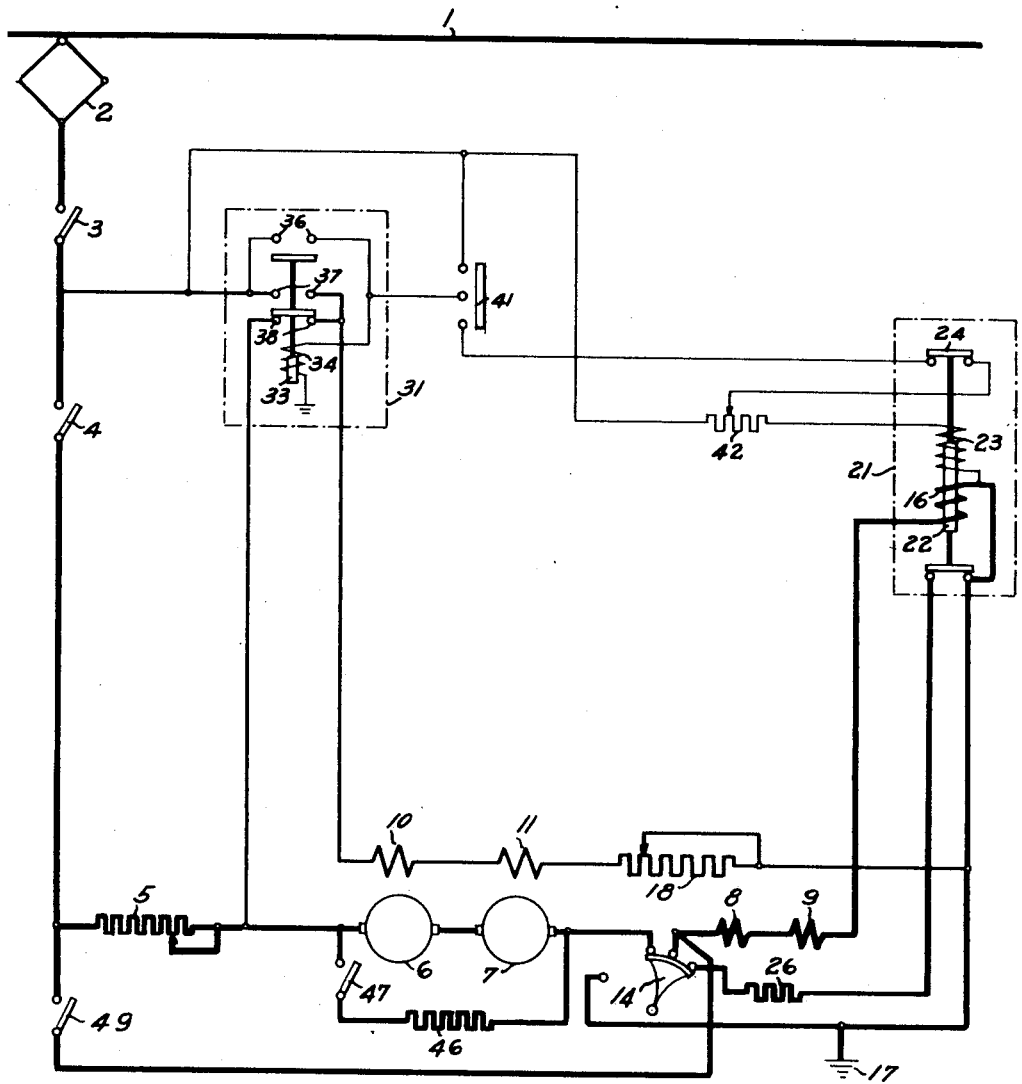
Inventor
F. Prantl
by G. P. Delvin
Attorney Patented Apr. 10, 1934

1,954,770

UNITED STATES PATENT OFFICE 1,954,770

TRACTION MOTOR CONTROL SYSTEM

Franz Prantl, Wettingen, Switzerland, assignor to Aktiengesellschaft Brown Boveri & Cie., Baden, Switzerland, a joint-stock company of Switzerland Application March 10, 1932, Serial No. 597,897
In Germany March 9, 1931

9 Claims. (Cl. 172—179)

This invention relates to improvements in systems for controlling compound wound traction motors for vehicles which are to be braked by regenerative operation of the motors to return energy to the line or by dissipation of the regenerated energy in a resistance.

Traction vehicles are frequently equipped with compound traction motors for the purpose of returning energy to the supply line by regeneration when the speed of the vehicle is to be decreased. The series field windings of the motor are then generally such that, at high speeds with weakened shunt field windings, the motors have substantially series motor characteristics. Such motors are then subject to the disadvantage that, upon change from motoring to braking operation, a relatively long period of time is required, due to the self induction of the shunt field windings, before the shunt field excitation is sufficiently changed to permit full regenerative operation of the motors. Such delay in braking is, however, not permissible on railways and quick acting devices must be provided to avoid the delay. Such devices are, however, complicated and do not always operate similarly under the same conditions which prevents their use in practice.

It is, therefore, among the objects of the present invention to provide a system for the control of compound traction motors arranged for regenerative braking in which the series fields of the motors are immediately weakened upon reversal of the controller into the braking position.

Another object of the invention is to provide a system for the control of compound traction motors in which, even though the shunt fields remain fully excited and are continuously connected with the supply line, the series fields are so under excited, upon change from motoring to regenerative braking operation, as to immediately obtain the full regenerative action and hence the full braking power of the motors on the vehicle.

Another object of the invention is to provide a system for the control of compound traction motors in which the shunt fields remain fully excited during all braking operations of the motors.

Another object of the invention is to provide a system for the control of compound traction motors in which the current in the shunt field windings is not reduced during change of operation of the motors from motoring to braking operation.

Another object of the invention is to provide a system for the control of compound traction motors in which system means are provided to insure stable operation of the motors during regenerative braking operation.

Another object of the invention is to provide a system for the control of compound traction motors in which system means are provided to retain the shunt fields in excited condition even though the supply line voltage fails momentarily.

Objects and advantages other than those above set forth will be apparent from the following description when read in connection with the accompanying drawing which diagrammatically illustrates the connections of a plurality of compound wound traction motors in which the motors are supplied from an overhead line and are adapted to return energy to the line upon regenerative operation of the motors as well as adapted to be used for short circuit braking, i. e., operation of the motors as generators with dissipation of the energy produced in resistances.

Referring more particularly to the drawing by characters of reference, the reference numeral 1 designates an overhead supply line from which electric current is taken by a suitable current collector such as a pantograph indicated at 2. The current collector is connected through a main switch 3 which may be operable manually through a contactor 4 and a variable resistance 5 connected with a plurality of compound wound traction motors. The resistance 5 is the usual starting resistance and the connections thereof are controlled by a suitable main controller (not shown) of the vehicle. The motors comprise the armatures 6 and 7, the series field windings 8 and 9 and the shunt field windings 10 and 11. The motors are of the normally direct compounded type but the series field windings 8 and 9 act in opposition to the shunt field windings 10 and 11 during regenerative braking operation. The contactor 4 is preferably a portion of the main controller structure and the resistance 5 is divided into several portions which are arranged to be connected in sequence with the motors during starting as is well known. The connection of the armatures with the series field windings of the motors is controlled by a switch 14 which is also preferably a portion of or is operated by the main controller of the vehicle. A coil 16 may be connected between the series field windings 8 and 9 and ground as at 17 and a variable resistance 18 is connected between the shunt fields 10 and 11 and ground 17. The resistance 18 permits adjustment of the excitation of the shunt windings of the motors to any desired value and is out of circuit at low motoring running speeds and during all braking operations.

The coil 16 forms a current coil of a relay generally designated at 21 and comprising an armature 22 and a coil 23. The relay 21, in addition to the bridging of the contacts thereof, is also arranged to open or close an auxiliary switch 24. The relay 21 aids the switch 14 in controlling the connection or disconnection of a resistance 26 between the motor armature and ground 17 in parallel with the series field windings 8 and 9, upon the occurrence of certain predetermined conditions.

The shunt field windings 10 and 11 are connected with the line 1 through a no-voltage relay generally designated at 31 and through the line switch 3 and the pantograph 2. The relay 31 has an armature 33 and a coil 34, the armature being arranged to bridge a plurality of pairs of contacts 36, 37 and 38. The coil 34 of the relay is arranged to be connected with the line 1 through a contactor 41 which is preferably arranged on the main controller of the vehicle or is operated thereby. The contactor 41 cooperates with the switch 24 and a resistance 42 to control the supply of potential to the coil 23 of the relay 21.

A resistance 46 is arranged to be connected in parallel with the circuit connected with the armatures 6 and 7 of the motors by means of a contactor 47 when it is desired to connect the motor armatures for resistance braking in one of the braking connections possible with the system, and a contactor 49 is arranged to cooperate with switch 14 to reconnect the series fields 8 and 9 of the motors in inverse series connection with the armatures 6 and 7 when such action is desirable as will be described hereinafter. It will be understood that contactors 41, 47 and 49 are preferably portions of and are operated by the main controller (not shown) of the vehicle.

When the vehicle is to be started, the several portions of the system will be in the position shown in the drawing. The line switch 3 is then closed. Contactor 41 is open in the zero position of the main controller and is closed only between the zero and the first running position. A circuit is completed from the line 1 over contactor 41 through coil 34 of the relay 31 to ground which causes the armature 33 of the relay 31 to lift thus bridging contacts 36 and 37. Bridging of contacts 36 and 37 completes circuits from the line over the shunt field windings 10 and 11 and the resistance 18 to the ground and over the contactor 41, switch 24 and an adjustable portion of resistance to the coil 23 of the relay 21 and to ground. The armature of the relay 21 then lifts. Auxiliary switch 24 is opened by the relay 21, the opening of such switch interrupting one of the circuits from the line 1 to the coil 23 and leaving the full value of the resistance 42 between the line and the coil which thus receives only sufficient current to retain the armature 22 of the relay 21 in its raised position. Movement of the main controller leaves contactor 14 in position to connect the armatures and the fields 8 and 9 in series, contactor 4 is then closed and portions of resistance 5 are short circuited successively to start the motors. It will be understood that operation of contactor 14, contactor 4 and the short circuiting of the resistance 5 is produced by the same or associated mechanisms, preferably the main controller. A circuit is then completed from the line 1 over pantograph 2, line switch 3, contactor 4, resistance 5, armatures 6 and 7, contactor 14, series field windings 8 and 9, and coil 16, to ground 17. Operation of the relay 21 has interrupted the contacts thereof and disconnects the series field winding shunting resistance 26 which gives the normal excitation of the series fields relative to the excitation of the shunt fields.

During running operation of the motors, at speeds above the lowest running speed, the excitation of fields 10 and 11 is reduced by insertion of a variable portion of resistance 18 in series with the fields. When the conditions of operation of the vehicle are such as to require regenerative braking, movement of the main controller of the vehicle into the lower running positions, inserts portions of resistance 5 into the motor circuit and thereby causes a weakening of the current flowing through coil 16. The main controller then entirely short circuits resistance 18 which results in strengthening of the excitation of shunt fields 10 and 11 to the maximum value. It is, of course, assumed that the vehicle speed is sufficiently high to cause the back E. M. F. of armatures 6 and 7 to be then increased above the E. M. F. of line 1. The motors thus act as generators and reverse the direction of current flow so that current now flows in a direction opposite to the previous direction of flow in the motor circuit which circuit includes line 1, pantograph 2, main switch 3, contactor 4, resistance 5, armatures 6 and 7, switch 14, series fields 8 and 9, coil 16 and ground 17. Reversal of current in coil 16 causes such coil to oppose the action of coil 23 and the armature 22 of the relay 21 drops. Resistance 26 is then connected in parallel with the series field windings 8 and 9 of the motors and the excitation of such fields is weakened to a degree determined by the magnitude of resistance 26 in circuit. Current then flows in shunt fields 10 and 11 in the same direction as during running operation of the motors but the direction of current flow in the series fields is reversed. Fields 8 and 9 therefore oppose fields 10 and 11 which results in a stable braking. The magnitude of resistance 5 in circuit controls the amount of regenerated current. The shunt fields remain fully excited and hence the self induction of such shunt fields is without effect on the speed of initiation of the regenerative braking operation. The connections of the shunt fields are not changed at any time; the only change required in the system to bring about regenerative braking operation of the motors being such movement of the controller of the vehicle as will place portions of resistance 5 in circuit with the armatures of the motors and secure maximum excitation of fields 10 and 11. The regenerative braking thus begins immediately upon movement of the controller into the regenerative braking position.

When the system is to be operated for so-called short circuit braking which is also known as resistance or dynamic braking, the shunt fields being excited from the line, movement of the main controller into the short circuit braking position opens contactor 4 and closes contactor 49 and moves contactor 14 to bridge the first two contacts from the left. The armatures 6 and 7 are thus connected over resistance 5. A circuit is completed from armature 7 over contactor 14, coil 16, series field windings 9 and 8, contactor 49, resistance 5 and back to armature 6. Series fields 8 and 9 are thus reversed and the traction motors operate as generators. The speed of the vehicle may then be regulated by changing the amount of resistance 5 in circuit. If resistance 5 is unable to dissipate the entire braking energy, contactor 47 may be closed to insert resistance 46 into the above circuit to dissipate a portion of the braking energy.

If a short circuit braking operation is begun and the voltage of line 1 fails for any reason or the circuit of fields 10 and 11 therewith is interrupted, the armature 33 of relay 31 will drop and the connections of shunt fields 10 and 11 will be changed by the bridging of contacts 38 to connect the shunt fields with the armatures of the motors. The shunt fields are thus excited from the current flowing in the armature circuit and braking action takes place regardless of the fact that the line 1 is without current.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In a system for controlling the compound wound traction motors of vehicles, the traction motors comprising armatures with series field windings and shunt field windings, a resistance arranged for connection in parallel with the series field windings of the motor, a relay controlling the parallel connection of said resistance, and a relay controlling the connections of the shunt field windings of the motor with the line supplying the motors without interrupting the excitation thereof, the last said relay connecting the shunt field windings across the armatures of the motors upon failure of the line voltage supplying the motors.

2. In a system for controlling the compound traction motors of vehicles, the traction motors comprising armatures with series field windings and shunt field windings, a resistance arranged for connection in parallel with the series field windings of the motor, a relay controlling the parallel connection of said resistance, said relay having a plurality of coils, a resistance connected with one of the coils, an auxiliary switch operated by said relay and connected with the last said resistance, a contactor controlling the supply of current to said relay, said auxiliary switch and said contactor cooperating to control the supply of current through the last said resistance, and a relay controlling the connection of the shunt field windings of the motors without interrupting the excitation thereof.

3. In a system for controlling operation of the traction motors of vehicles; traction motors each comprising an armature, field windings connected to shunt the armatures and field windings arranged to be connected in series with the armatures of the motors, means for varying the excitation of the series connected field windings of said motors, and means for varying the excitation of the shunt connected field windings of said motor, said field windings being connected to act additively during motoring operation, the last said means being out of the circuit of said shunt field windings during the entire period of braking operations.

4. In a system for controlling operation of the traction motors of vehicles; a line supplying electric current to the vehicle, traction motors comprising an armature, field windings connected to shunt the armatures and field windings arranged to be connected in series with the armatures of the motors, dynamic means for varying the excitation of the series connected field windings of said motors, dynamic means for varying the excitation of the shunt connected field windings of said motor, and a controller controlling the connections of both said means, said means and said controller cooperatively controlling the connections of said fields of each of the motors to vary the same during braking operations of said motors.

5. In a system for controlling operation of the traction motors of vehicles; a line supplying electric current to the vehicle, traction motors comprising an armature, field windings connected to shunt the armatures and field windings arranged to be connected in series with the armatures of the several motors, means for varying the excitation of the series connected field windings of said motors, means for varying the excitation of the shunt connected field windings of said motor, a controller controlling the connections of both said means, a variable resistance adjusted by said controller to vary the voltage applied to said motors from said line and to control the return of current to said line, and a resistance arranged to be connected with the armatures of said motors to aid said variable resistance in controlling the return of current to said line.

6. In a system for controlling the operation of the traction motors of vehicles, an electric current supply line for the vehicle, traction motors comprising an armature, field windings connected in parallel with the armatures and field windings connected in series with the armatures of the several motors, a resistance adjustably connected in series with the parallel fields of said motors to vary the excitation thereof, a resistance arranged to be connected with the series fields to vary the excitation thereof, a relay having a coil connected with the series fields of said motors, and means controlling the connections of the series fields with the armatures and cooperating with said relay to control the connections of the last said resistance.

7. In a system for controlling the operation of the traction motors of vehicles, an electric current supply line for the vehicle, traction motors comprising an armature, field windings connected in parallel with the armatures and field windings connected in series with the armatures of the several motors, a resistance adjustably connected in series with the parallel fields of said motors to vary the excitation thereof, a resistance arranged to be connected with the series fields to vary the excitation thereof, a relay having a voltage coil and having a current coil, means connecting the voltage coil of said relay with said line, and means controlling the connections of the series fields with the armatures and cooperating with said relay to control the connections of the last said resistance.

8. In a system for controlling the operation of the traction motors of vehicles, an electric current supply line for the vehicles, traction motors comprising an armature, field windings connected in parallel with the armatures and field windings connected in series with the armatures of the several motors, a resistance adjustably connected in series with the parallel fields of said motors to vary the excitation thereof, a resistance arranged to be connected with the series fields to vary the excitation thereof, a relay having a voltage coil and having a current coil, the current coil being connected with the series fields of said motors, a contactor connecting the voltage coil of said relay with said line, an auxiliary switch operated by said relay and cooperating with said contactor to control energization of the voltage coil of said relay, and means controlling the connections of the series fields with the armatures and cooperating with said relay to control the connections of the last said resistance.

9. In a system for controlling the operation of the traction motors of vehicles, an electric current supply line for the vehicle, traction motors comprising an armature, field windings connected in parallel with the armatures and field windings connected in series with the armatures of the several motors, a resistance adjustably connected in series with the parallel fields of said motors to vary the excitation thereof, a resistance arranged to be connected with the series fields to vary the excitation thereof, a relay having a coil connected with the series fields of said motors, and means controlling the connections of the series fields with the armatures and cooperating with said relay to control the connections of the last said resistance, and a relay energized upon connection of said motors with said line, said relay controlling connection of the parallel fields with the armatures of said motors.

FRANZ PRANTL.